United States Patent [19]

Mitumaru

[11] Patent Number: 4,660,839
[45] Date of Patent: Apr. 28, 1987

[54] ENDLESS BACKUP RING FOR HYDRAULIC APPARATUS SEAL

[75] Inventor: Mititoshi Mitumaru, Osaka, Japan

[73] Assignee: Koyo Seiko, Co. Ltd., Osaka, Japan

[21] Appl. No.: 806,415

[22] Filed: Dec. 9, 1985

[51] Int. Cl.⁴ .............................................. F16J 15/32
[52] U.S. Cl. ................................... 277/153; 277/213; 277/215
[58] Field of Search ................... 277/152, 153, 207 R, 277/213, 215, 9

[56] References Cited

U.S. PATENT DOCUMENTS

| | | | |
|---|---|---|---|
| 2,292,041 | 8/1942 | Bowers | 277/213 X |
| 3,897,072 | 7/1975 | Inka et al. | 277/215 |
| 4,427,206 | 1/1986 | Sugiyama | 277/153 |
| 4,431,200 | 2/1984 | Sugimura | 277/215 |
| 4,498,681 | 2/1985 | Heinz | 277/215 |
| 4,508,312 | 4/1985 | Taylor et al. | 277/215 X |

FOREIGN PATENT DOCUMENTS

| | | | |
|---|---|---|---|
| 2218096 | 10/1973 | Fed. Rep. of Germany | 277/215 |
| 46-32881 | 9/1971 | Japan | 277/9 |
| 123353 | 2/1919 | United Kingdom | 277/215 |

*Primary Examiner*—Robert S. Ward
*Attorney, Agent, or Firm*—Finnegan, Henderson, Farabow, Garrett and Dunner

[57] ABSTRACT

An endless backup ring for hydraulic apparatus seal comprises a ring-like body having, a plurality of notches extending radially through a portion of the ring-like body and forming a staggered relationship in the circumferential direction between each others to enable said ring-like body to expand circumferentially when stretched.

8 Claims, 6 Drawing Figures

ENDLESS BACKUP RING FOR HYDRAULIC APPARATUS SEAL

FIELD OF THE INVENTION

The present invention relates to an endless backup ring for improving pressure resistance of a seal ring or the like used in a seal unit of a hydraulic apparatus and to the prevention of damage to the seal ring.

BACKGROUND OF THE INVENTION

Generally, in a seal unit used in a hydraulic apparatus having a piston and a cylinder, a seal ring is fitted onto the inner circumferential surface of the cylinder. The seal ring is provided with an annular lip which is wound with an elastic clamping member, such as a coil spring, so as to be pressed onto a shaft of a piston. A high fluid pressure bears radially and axially on the annular lip on the coil lubricant side of the seal. In an ordinary seal unit in which a seal ring is constituted only by elastic matter such as rubber or the like, the annular lip is often deformed or damaged when it is pressed by the piston shaft. As a result, the seal ring cannot perform its sealing function satisfactorily.

In order to prevent such a deformation from occurring to the annular lip, it has been proposed to fit a backup ring of a rigid material, such as metal, plastic, or the like, in an inner circumferential surface of the seal ring and in the air-side back surface of the annular lip of the seal ring. Furthermore, since it is necessary to cause the piston shaft having an outer diameter larger than the inner diameter or the seal ring, to pass through the latter in assembling the apparatus, there has been proposed a backup ring that is cut in a circumferential portion so as to make the ring extensible in the radial direction. This is disclosed in U.S. Pat. No. 4,468,041.

There has also been proposed a backup ring in which the ring-like body thereof is cut in such a manner that the opposite cut end portions of the body fit together through a concavo-convex engagement so as not to cause a relative discrepancy in the radial direction at the opposite cut end portions. This is disclosed in Japanese Utility Model Publication No. 65464/1983.

In any of the proposals described above, however, the fact that part of the circumference of the backup ring has been cut off causes radial or axial misalignment between the opposite cut ends thereof. As a result, the backup ring often slips off when it is attached to a seal ring or when the seal ring with such a backup ring mounted onto a piston. The backup ring also often damages the seal ring to which it is attached by biting into the seal ring because of misalignment of the opposite cut end surfaces of the backup ring when the seal ring is in use with the backup ring.

Sometimes, the backup ring causes deterioration of the sealing function because of abrasion caused by abnormal contact with a piston. Moreover, it is difficult to form concavo-convex portions at the opposite cut ends of the backup ring and it is impossible to prevent damage from occurring in the seal ring due to the axial misalignment between the opposite cut end surfaces.

OBJECTS AND SUMMARY OF THE INVENTION

It is therefore an object to solve the foregoing problems of the prior art.

Another object of the present invention is an endless backup ring for hydraulic apparatus seal that doesn't slip off when it is attached to a seal ring and is mounted onto the shaft of a piston.

A further object of the present invention is an endless backup ring for hydraulic apparatus seal in which radial or axial misalignment between opposite end portions is eliminated to prevent damage occurring to a seal ring.

Still another object of the present invention is an endless backup ring for hydraulic apparatus seal that is not deformed by fluid pressure acting on a seal ring and exhibits sufficient pressure resistance over a long term.

Yet another object of the present invention is an endless back up ring for hydraulic apparatus seal that is simple in structure and easy to manufacture.

The foregoing objects of the present invention are attained by an endless backup ring for hydraulic apparatus seal comprising a ring-like body having a set of notches, and said notches formed radially in at least one portion of said circumferential surface of the ring-like body such that the ring-like body is extensible in the radial direction thereof.

BRIEF DESCRIPTION OF THE DRAWINGS

The manner by which the above objects and other objects, features, and advantages of the present invention are attained will become more apparent form the following detailed description when it is considered in view of the drawings, wherein.

DETAILED DESCRIPTION OF THE PREFERRED EMBODIMENTS

Figure 1:
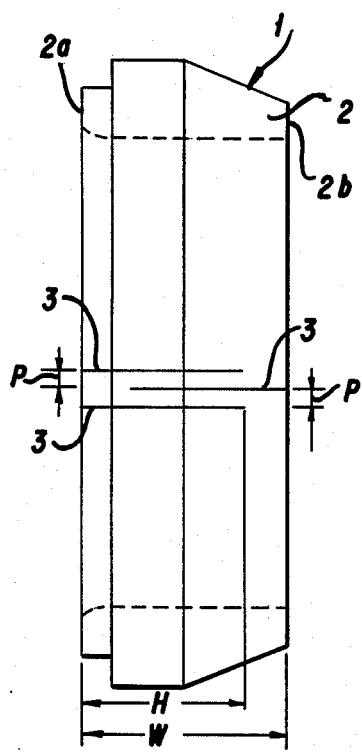
FIG. 1 is a plan view of a portion of an endless backup ring for hydraulic apparatus seal according to an embodiment of the present invention.
Figure 2:
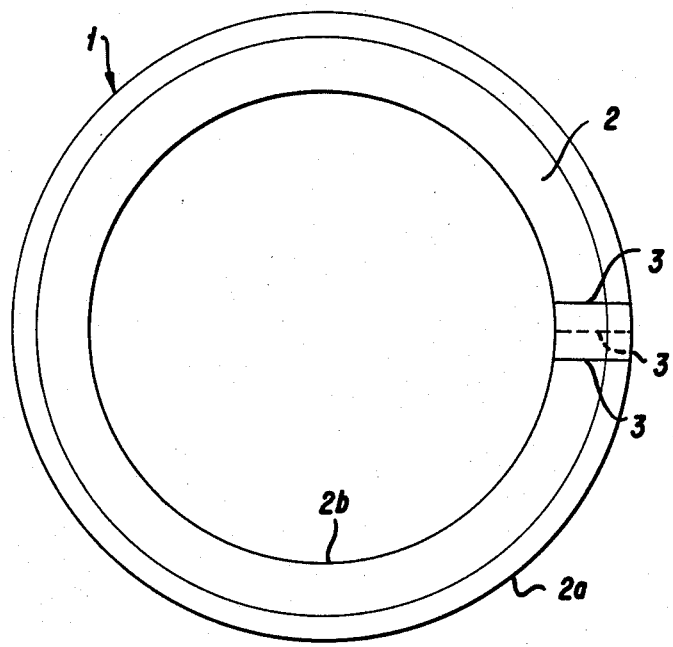
FIG. 2 is a side view of the endless backup ring of FIG. 1.

FIGS. 1 and 2 show an embodiment of the present invention wherein an endless backup ring 1 is constituted by a ring-like body 2 made of synthetic resin and formed with notches 3. The notches 3 are formed in the opposite end surfaces 2a and 2b of the ring-like body 2, i.e., the inner end surface 2b and the outer end surface 2a, at regular intervals along the circumference of the body 2 and extend in the radial direction alternately from the inner and outer end surfaces of the body 2 so as to form a staggered relationship in the circumferential direction between the notches. For example, three notches 3 are formed, as shown in FIG. 1, to make the ring-like body 2 extensible radially. The height H of each notch 3 is selected to be smaller than the width W of the ring-like body 2. The amount of extension of the ring-like body 2 in the axial direction can be suitably adjusted by appropriately selecting the height H of each notch 3 and the circumferential interval pitch P of the notches 3.

Figure 3:
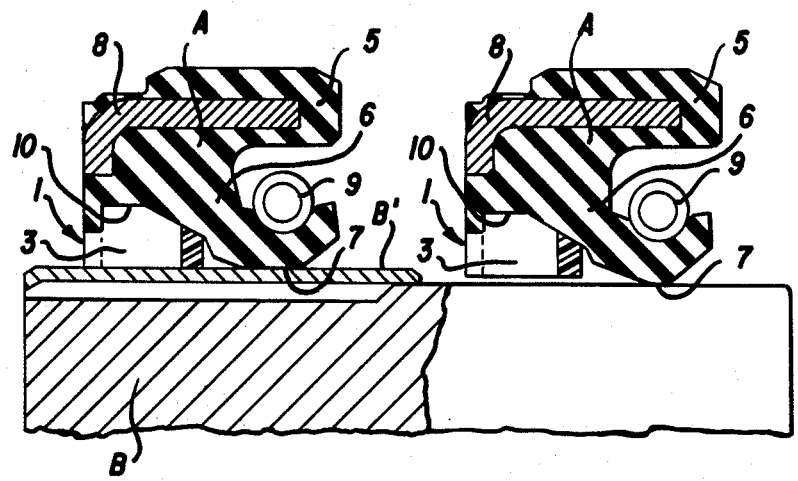
FIG. 3 is a longitudinal sectional view showing the endless backup ring of FIG. 1 attached to a seal ring.

As shown in FIG. 3, the backup ring 1 contacts a seal ring A having a base portion 5 for fitting to a wall of a housing and a lip portion 6 having a lip edge 7 in resilient sliding contact with a shaft B. A reinforcing ring 8 is associated with base portion 5 of seal ring A and a tubular ring 9 is associated with the lip portion 6. An inner peripheral surface 10 of lip portion 6 is indented for receiving the backup ring 1.

Figure 4:
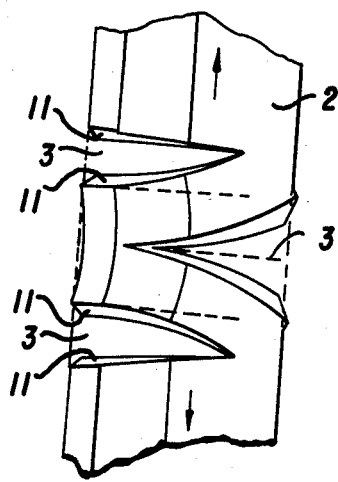
FIG. 4 is an enlarged perspective view of a part of the endless backup ring of FIG. 1 showing the state in which notch portions are stretched in the circumferential direction.

As shown in FIGS. 3 and 4, when the endless backup ring 1 is mounted on the shaft B under the condition that the endless backup ring 1 is attached to seal ring A, the endless backup ring 1 must first pass over an increased diameter section B' of the shaft B. The notches 3 expand in the circumferential direction to enlarge the inner diameter of the ring 1. Upon completion of the mounting of the seal unit onto the apparatus, the notches 3 shrink in the circumferential direction and recover the original substantially-complete ring-like body 2 to resist the force of the fluid pressure acting on the seal ring A. It is apparent that when notches 3 shrink, the opposing interior surfaces 11 of the notches contact and seal each other so that backup ring 1 forms a seal.

Figure 5:
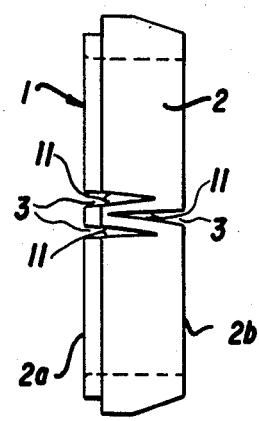
FIG. 5 is a plan view of another embodiment of the endless backup ring for hydraulic apparatus seal of the present invention.

FIG. 5 shows another embodiment of the present invention, in which an endless backup ring 1 is formed with notches 3 at the same time that the endless backup ring 1 is molded. In this embodiment, the notches 3 are alternately formed in the inner and outer end surfaces 2a and 2b of the ring-like body 2 at regular intervals in the circumferential direction to extend in the radial direction so as to form a staggered relationship in the circumferential direction between the notches 3. The notches 3 are formed when the endless backup ring 1 is being stretched in the radial direction so that the notches 3 shrink in the circumferential direction to form a part of the substantially complete ring-like body 2 when the endless backup ring 1 has been attached to a seal ring. It is apparent that when notches 3 shrink, the opposing interior surfaces 11 of the notches contact and seal each other so that backup ring 1 forms a seal.

Figure 6:
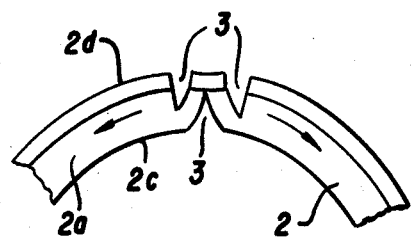
FIG. 6 is a side view of another embodiment of the endless backup ring for hydraulic apparatus seal of the present invention.

FIG. 6 shows a further embodiment, in which an endless backup ring 1 is provided with notches 3 that are formed in the inner and outer circumferential surfaces 2c and 2d, respectively, of the ring-like body 2 at regular intervals and extend in the radial direction alternately from the inner and outer circumferential surfaces of the body 2. Thus, the ring-like body 2 is made extensible in the radial direction similarly to the foregoing embodiments. In this case, the notches 3 may be formed when the endless backup ring 1 is stretched in the radial direction during molding.

Although a set of notches 3 are formed at a portion of the ring-like body 2 in each of the foregoing embodiments, the present invention is not restricted to that configuration. Further, the shape of the cross-section of the endless backup ring 1 is not limited to the shapes illustrated in the foregoing specific embodiments.

According to the present invention, as described above, notches are formed in at least one portion of the circumferential surface of a ring-like body of an endless backup ring, so that the ring-like body is made radially extensible. The endless backup ring for hydraulic apparatus seal according to the present invention is constituted by a ring-like body having no cut-off portion so that it will not slip when the seal ring is mounted on the shaft. The endless backup ring will not deform due to radial or axial misalignment so that damage to the seal ring can be prevented. The endless backup ring is not deformed by fluid pressure acting on the seal ring since the notches thereof shrink in the circumferential direction to form part of the substantially complete ring-like body. Moreover, the endless backup ring for hydraulic apparatus seal according to the present invention can be easily manufactured.

In the case where the endless backup ring for hydraulic apparatus seal of the present invention is attached to the seal ring and is mounted onto the shaft of a piston, the notches extend in the radial direction so as to make the inner diameter of the endless backup ring increase when the endless backup ring passes over an increased diameter portion of the shaft. Upon completion of mounting of such a seal unit the notches shrink so that the endless backup ring recovers its original substantially complete ring-like shape. Thus, the endless backup ring exhibits its pressure resistance property against the fluid pressure acting on the seal ring.

It should be understood that the present invention is not limited to the particular embodiments described, but rather is susceptible to modifications, alternatives, and equivalent arrangements within the scope of the appended claims.

I claim:

1. A hydraulic seal for sealing a space between a shaft and a corresponding shaft housing, comprising:
   an endless elastomeric seal member having a base portion for fitting to a wall of the housing, said base portion having a reinforcing ring therein, and having a lip portion including a lip edge for making resilient sliding contact with the shaft surface and also including an inner peripheral surface spaced from the shaft surface;
   an endless backup ring in contact with said inner peripheral surface of said seal member and disposed between said inner peripheral surface and said shaft surface, said backup ring having a ring-like body having at least two notches; and
   a first notch formed in a circumferential surface of said ring-like body and a second notch formed in another circumferential surface opposite to said first notch, said first and second notches forming a staggered relationship in the circumferential direction between each other and extending radially through a portion of said ring-like body to enable said ring-like body to expand circumferentially.

2. The seal according to claim 1, wherein said ring-like body is formed of resin.

3. A hydraulic seal for sealing a space between a shaft and a corresponding shaft housing, comprising:
   an endless elastomeric seal member having a base portion for fitting to a wall of the housing, said base portion having a reinforcing ring therein, and having a lip portion including a lip edge for making resilient sliding contact with the shaft surface and also including an inner peripheral surface spaced from said shaft surface;
   an endless backup ring in contact with said inner peripheral surface of said seal member and disposed between said inner peripheral surface and said shaft surface, said backup ring having a ring-like body having a plurality of notches formed on a circumferential surface thereof;
   a plurality of second notches extending axially into said ring-like body from an inner circumferential surface thereof; and
   a plurality of first notches extending axially into said ring-like body from an outer circumferential surface thereof, each of said second notches being located between two adjacent first notches, said first and second notches for enabling said ring-like body to expand circumferentially.

4. The seal according to claim 3, wherein said first notches are uniformly spaced around the inner circumference surface and said second notches are uniformly spaced around the outer circumferential surface.

5. The seal according to claim 1, wherein an inner diameter of said endless backup ring is larger than an inner diameter of said lip edge.

6. The seal according to claim 1, wherein said at least two notches each having opposing interior surfaces configured contact each other to maintain a seal when said seal member and backup ring are fully installed on said housing.

7. The seal according to claim 3, wherein an inner diameter of said endless backup ring is larger than an inner diameter of said lip edge.

8. The seal according to claim 3, wherein said plurality of notches each have opposing interior surfaces configured to contact each other to maintain a seal when said seal member and backup ring are fully installed.

* * * * *